(12) United States Patent
Hatton

(10) Patent No.: US 9,305,453 B2
(45) Date of Patent: Apr. 5, 2016

(54) METHOD AND APPARATUS FOR EXTRA-VEHICULAR EMERGENCY UPDATES FOLLOWING AN ACCIDENT

(71) Applicant: Ford Global Technologies, LLC, Dearborn, MI (US)

(72) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/710,757

(22) Filed: May 13, 2015

(65) Prior Publication Data

US 2015/0243159 A1 Aug. 27, 2015

Related U.S. Application Data

(60) Division of application No. 14/594,709, filed on Jan. 12, 2015, which is a continuation of application No. 13/832,881, filed on Mar. 15, 2013, now Pat. No. 8,933,822.

(51) Int. Cl.

| | |
|---|---|
| G08B 1/08 | (2006.01) |
| G08B 25/01 | (2006.01) |
| G08G 1/127 | (2006.01) |
| G08G 1/00 | (2006.01) |
| G07C 5/00 | (2006.01) |
| H04W 4/22 | (2009.01) |
| H04W 4/00 | (2009.01) |

(Continued)

(52) U.S. Cl.
CPC .............. *G08B 25/016* (2013.01); *G07C 5/008* (2013.01); *G08G 1/00* (2013.01); *G08G 1/127* (2013.01); *H04W 4/22* (2013.01); *H04L 1/00* (2013.01); *H04M 1/00* (2013.01); *H04W 4/00* (2013.01)

(58) Field of Classification Search
CPC .................................. H04M 1/00; H04W 4/00
See application file for complete search history.

(56) References Cited

U.S. PATENT DOCUMENTS

| | | |
|---|---|---|
| 6,366,202 B1 | 4/2002 | Rosenthal |
| 6,526,335 B1 | 2/2003 | Treyz et al. |
| 6,573,833 B1 | 6/2003 | Rosenthal |

(Continued)

FOREIGN PATENT DOCUMENTS

| | | |
|---|---|---|
| CN | 101568060 A | 10/2009 |
| CN | 101998235 A | 3/2011 |

(Continued)

OTHER PUBLICATIONS

European Patent Office.

(Continued)

*Primary Examiner* — Shirley Lu
(74) *Attorney, Agent, or Firm* — Jennifer Stec; Brooks Kushman P.C.

(57) ABSTRACT

A system includes a processor configured to receive instructions from a vehicle computing system (VCS) to being reporting a mobile device location. The processor is also configured to access a list of emergency contacts. Further, the processor is configured to determine that a mobile device has left a predetermined perimeter around a last known vehicle location. The processor is additionally configured to periodically report mobile device GPS coordinates to members of the emergency contacts list, until the mobile device reaches a destination.

20 Claims, 6 Drawing Sheets

(51) Int. Cl.
H04L 1/00 (2006.01)
H04M 1/00 (2006.01)

(56) References Cited

U.S. PATENT DOCUMENTS

| | | | |
|---|---|---|---|
| 7,047,117 B2 | 5/2006 | Akiyama et al. | |
| 7,207,041 B2 | 4/2007 | Elson et al. | |
| 7,266,435 B2 | 9/2007 | Wang et al. | |
| 7,505,784 B2 | 3/2009 | Barbera | |
| 7,602,782 B2 | 10/2009 | Doviak et al. | |
| 7,801,941 B2 | 9/2010 | Conneely et al. | |
| 8,121,802 B2 | 2/2012 | Grider et al. | |
| 8,131,458 B1 | 3/2012 | Zilka | |
| 8,538,374 B1* | 9/2013 | Haimo et al. | 455/404.2 |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chemetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |
| 2006/0287821 A1 | 12/2006 | Lin | |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0132572 A1 | 6/2007 | Itoh et al. | |
| 2007/0294625 A1 | 12/2007 | Rasin et al. | |
| 2008/0086455 A1 | 4/2008 | Meisels et al. | |
| 2008/0148374 A1 | 6/2008 | Spaur et al. | |
| 2008/0220718 A1 | 9/2008 | Sakamoto et al. | |
| 2008/0313050 A1 | 12/2008 | Basir | |
| 2009/0010448 A1 | 1/2009 | Voto et al. | |
| 2009/0070148 A1 | 3/2009 | Skocic | |
| 2009/0075624 A1 | 3/2009 | Cox et al. | |
| 2009/0106036 A1 | 4/2009 | Tamura et al. | |
| 2009/0117890 A1 | 5/2009 | Jacobsen et al. | |
| 2009/0140064 A1 | 6/2009 | Schultz et al. | |
| 2009/0156182 A1 | 6/2009 | Jenkins et al. | |
| 2009/0228908 A1 | 9/2009 | Margis et al. | |
| 2009/0253466 A1 | 10/2009 | Saito et al. | |
| 2009/0318119 A1 | 12/2009 | Basir | |
| 2010/0063670 A1 | 3/2010 | Brzezinski et al. | |
| 2010/0094996 A1 | 4/2010 | Samaha | |
| 2010/0098853 A1 | 4/2010 | Hoffmann et al. | |
| 2010/0157061 A1 | 6/2010 | Katsman et al. | |
| 2010/0216509 A1 | 8/2010 | Riemer et al. | |
| 2010/0234071 A1 | 9/2010 | Shabtay et al. | |
| 2010/0306309 A1 | 12/2010 | Santori et al. | |
| 2011/0045842 A1 | 2/2011 | Rork et al. | |
| 2011/0087385 A1 | 4/2011 | Bowden et al. | |
| 2011/0105097 A1 | 5/2011 | Tadayon et al. | |
| 2011/0110530 A1 | 5/2011 | Kimura | |
| 2011/0112762 A1 | 5/2011 | Gruijters et al. | |
| 2011/0185390 A1* | 7/2011 | Faenger et al. | 725/75 |
| 2011/0195659 A1 | 8/2011 | Boll et al. | |
| 2011/0275358 A1 | 11/2011 | Faenger | |
| 2011/0296037 A1 | 12/2011 | Westra et al. | |
| 2012/0054300 A1 | 3/2012 | Marchwicki et al. | |
| 2012/0064917 A1 | 3/2012 | Jenkins et al. | |
| 2012/0065815 A1 | 3/2012 | Hess | |
| 2012/0079002 A1 | 3/2012 | Boll et al. | |
| 2012/0084292 A1 | 4/2012 | Liang et al. | |
| 2013/0059607 A1 | 3/2013 | Herz et al. | |

FOREIGN PATENT DOCUMENTS

| | | |
|---|---|---|
| CN | 102187361 A | 9/2011 |
| CN | 102572699 A | 7/2012 |

OTHER PUBLICATIONS

International Search Report for the corresponding PCT/US2010/37052.
Korean Intellectual.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Service Discovery Protocol (SDP) Layer Tutorial, Palowireless Bluetooth Research Center, http://www.palowireless.com/infotooth/tutorial/sdp.asp. Aug. 3, 2010.
IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.
Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.
Wikipedia, the free encyclopedia, X Window System, http://en.wikipedia.org/wiki/X_Window_System, Jun. 22, 2010.
Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.
"MobileSafer is your personal safe driving assistant", 2010 ZoomSafer Inc. <http://zoomsafer.com/products/mobilesafer> Dec. 28, 2010.
"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.
"PhonEnforcer FAQ's" Turn Off the Cellphone While Driving—PhonEnforcer. Turn Off the Cell Phone LLC. <http://turnoffthecellphone.com/faq.html> Dec. 28, 2010, pp. 1-2.
Lamberti, Ralph "Daimler Full Circle: The Rise of Vehicle-Installed Telematics—Telematics Munich 2009" Nov. 10, 2009.v.
Narasimhan, et al., A lightweight remote display management protocol for mobile devices, Application Research Center, Motorola Labs Schaumburg, IL, 2007, pp. 711-715.
Voelcker, Top 10 Tech Cars It's the Environment, Stupid, www.spectrum.ieee.org, Apr. 2008, pp. 26-35.
Yarden, et al., TUKI: A Voice-Activated Information Browser, IEEE 2009, pp. 1-5.
Gil-Castineira, et al., Integration of Nomadic Devices with Automotive User Interfaces, IEEE Transactions on Consumer Electronics, vol. 55, No. 1, Feb. 2009.
Nusser, et al., Bluetooth-based Wireless Connectivity in an Automotive Environment, Robert Bosch GmbH, VTC 2000, pp. 1935-1942.
Antuan Goodwin, The Car Tech Blog, Ford Unveils open-source Sync developer platform, http://reviews.cnet.com/8301-13746_7-10385619-48.html, Oct. 2009, pp. 1-5.
Chinese Patent Office, First Office Action for the corresponding Chinese Patent Application No. 201410099282.5 mailed May 18, 2015.

* cited by examiner

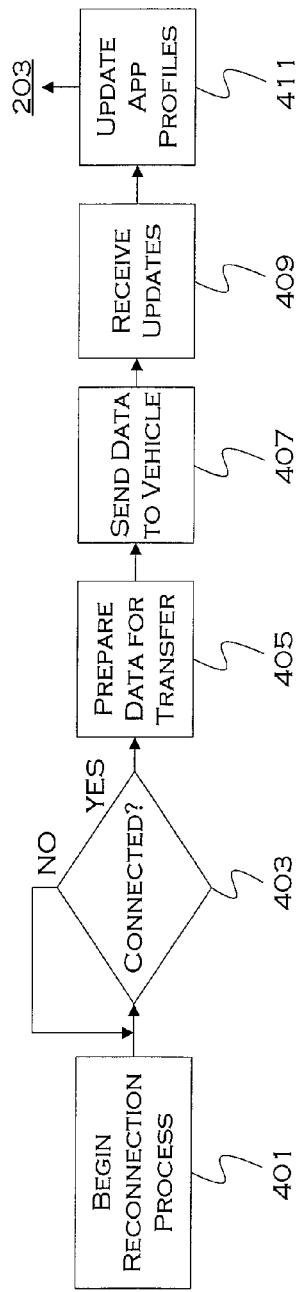
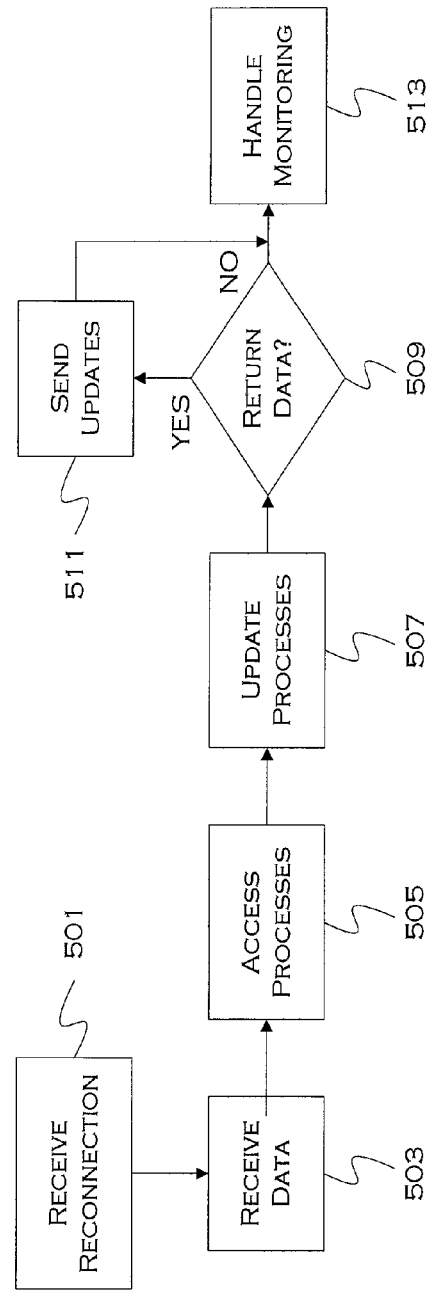
FIGURE 4
FIGURE 5

METHOD AND APPARATUS FOR EXTRA-VEHICULAR EMERGENCY UPDATES FOLLOWING AN ACCIDENT

CROSS-REFERENCE TO RELATED APPLICATIONS

This application is a division of U.S. application Ser. No. 14/594,709 filed Jan. 12, 2015, now U.S. Pat. No. 9,117,373, which is a continuation of U.S. application Ser. No. 13/832,881, filed Mar. 15, 2013, now U.S. Pat. No. 8,933,822 the disclosures of which are hereby incorporated in their entirety by reference herein.

TECHNICAL FIELD

The illustrative embodiments generally relate to a method and apparatus for extra vehicular emergency updates following an accident.

BACKGROUND

Many vehicular computing systems now provide advanced functionality to a user while the user travels within the vehicle. Navigation, musical playback, even limited access to internet data and calendar functions can be provided. When integrated with the nature of vehicular travel, countless opportunities are presented for improvements to the driving experience. Typically, however, the experience ends when the user leaves the vehicle.

Similarly, vehicles now come equipped with emergency condition reporting. Upon detection of an accident (e.g., through airbag deployment, etc.), a vehicle computing system may report the accident to an emergency responder. While the user is still at the scene, the vehicle computing system may continue to communicate with the emergency responder. If the vehicle is powered down, or the connection to a wireless device is fading, the call may be transferred to the wireless device for completion. Once the call is completed, however, the utility tends to end.

U.S. Patent Application 2006/0265534 generally relates to a data transfer device which controls data transfer between a first memory device and a second memory device, includes a first transfer arbiter circuit and a second transfer arbiter circuit. The first transfer arbiter circuit outputs, in response to a transfer instruction for transfer of data from the first memory device to the second memory device, first transfer instructions to transfer data in a first transfer unit in an order of addresses. The second transfer arbiter circuit outputs, in response to the first transfer instruction, second transfer instructions to transfer the data of the first transfer unit in a second transfer unit smaller than the first transfer unit. The second transfer arbiter circuit outputs the second transfer instruction in an order of accessible addresses in the first and second memory devices U.S. Patent Application 2009/0019240 generally relates to an information processing apparatus and method for enabling efficient content download and transfer processing operations. In downloading content, a content identifier thereof is acquired, a particular piece of content subject to transfer to an external device is identified on the basis of the acquired content identifier, the identified content is retrieved from a data storage block, and the retrieved content is transferred to the external device or written to an information recording medium, so that the processing of content downloading, the processing of content transfer to an external device and content writing to an information recording medium such as CD can be executed as a sequence of processing operations, thereby providing significantly efficient content download and content transfer or content write processing operations.

U.S. Patent Application 2009/0210483 generally relates to methods for remotely controlling actions of a virtual world identity of a user include transmitting instructions to the virtual world identity of the user from a mobile terminal associated with a real world identity of the user. The instructions are transmitted as a voice call, a text message and/or an instant message (IM). Updated information associated with the transmitted instructions is received from the virtual world identity of the user at the mobile terminal. The updated information includes an identification of a condition triggering transmission of the updated information.

SUMMARY

In a first illustrative embodiment, a system includes a processor configured to receive data, gathered by a vehicle, for use by a mobile application. The processor is further configured to receive instructions from the application interacting with the vehicle, for continuing usage in the extra-vehicular environment, utilizing the received data. Also, the processor is configured to determine that a mobile device, containing the processor, has left the vehicle. Additionally, the processor is configured to execute the instructions to continue application functionality while the mobile device remains out of contact with the vehicle in the extra-vehicular environment.

In a second illustrative embodiment, a computer-implemented method includes receiving data, gathered by a vehicle, for use by a mobile application. The method also includes receiving instructions from the application interacting with the vehicle, for continuing usage in the extra-vehicular environment, utilizing the received data. Further, the method includes determining that a mobile device, containing the processor, has left the vehicle. The method additionally includes executing the instructions to continue application functionality while the mobile device remains out of contact with the vehicle in the extra-vehicular environment.

In a third illustrative embodiment, a non-transitory computer readable storage medium stores instructions that, when executed by a processor, cause the processor to perform a method including receiving data, gathered by a vehicle, for use by a mobile application. The method also includes receiving instructions from the application interacting with the vehicle, for continuing usage in the extra-vehicular environment, utilizing the received data. Further, the method includes determining that a mobile device, containing the processor, has left the vehicle. The method additionally includes executing the instructions to continue application functionality while the mobile device remains out of contact with the vehicle in the extra-vehicular environment.

In a fourth illustrative embodiment, a system includes a processor configured to receive instructions from a vehicle computing system (VCS) to being reporting a mobile device location. The processor is also configured to access a list of emergency contacts. Further, the processor is configured to determine that a mobile device has left a predetermined perimeter around a last known vehicle location. The processor is additionally configured to periodically report mobile device GPS coordinates to members of the emergency contacts list, until the mobile device reaches a destination.

In a fifth illustrative embodiment, a computer-implemented method includes receiving instructions from a vehicle computing system (VCS) to being reporting a mobile device location. The method also includes accessing a list of emergency contacts. Further, the method includes determining that a mobile device has left a predetermined perimeter around a last known vehicle location. The method additionally includes periodically reporting mobile device GPS coordinates to members of the emergency contacts list, until the mobile device reaches a destination.

In another illustrative embodiment, a non-transitory computer readable storage medium stores instructions that, when executed by a processor, cause the processor to perform a method including receiving instructions from a vehicle computing system (VCS) to being reporting a mobile device location. The method also includes accessing a list of emergency contacts. Further, the method includes determining that a mobile device has left a predetermined perimeter around a last known vehicle location. The method additionally includes periodically reporting mobile device GPS coordinates to members of the emergency contacts list, until the mobile device reaches a destination.

BRIEF DESCRIPTION OF THE DRAWINGS

FIG. 4 shows an illustrative for importing data back to a vehicle;

FIG. 5 shows an illustrative vehicle re-entry update process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
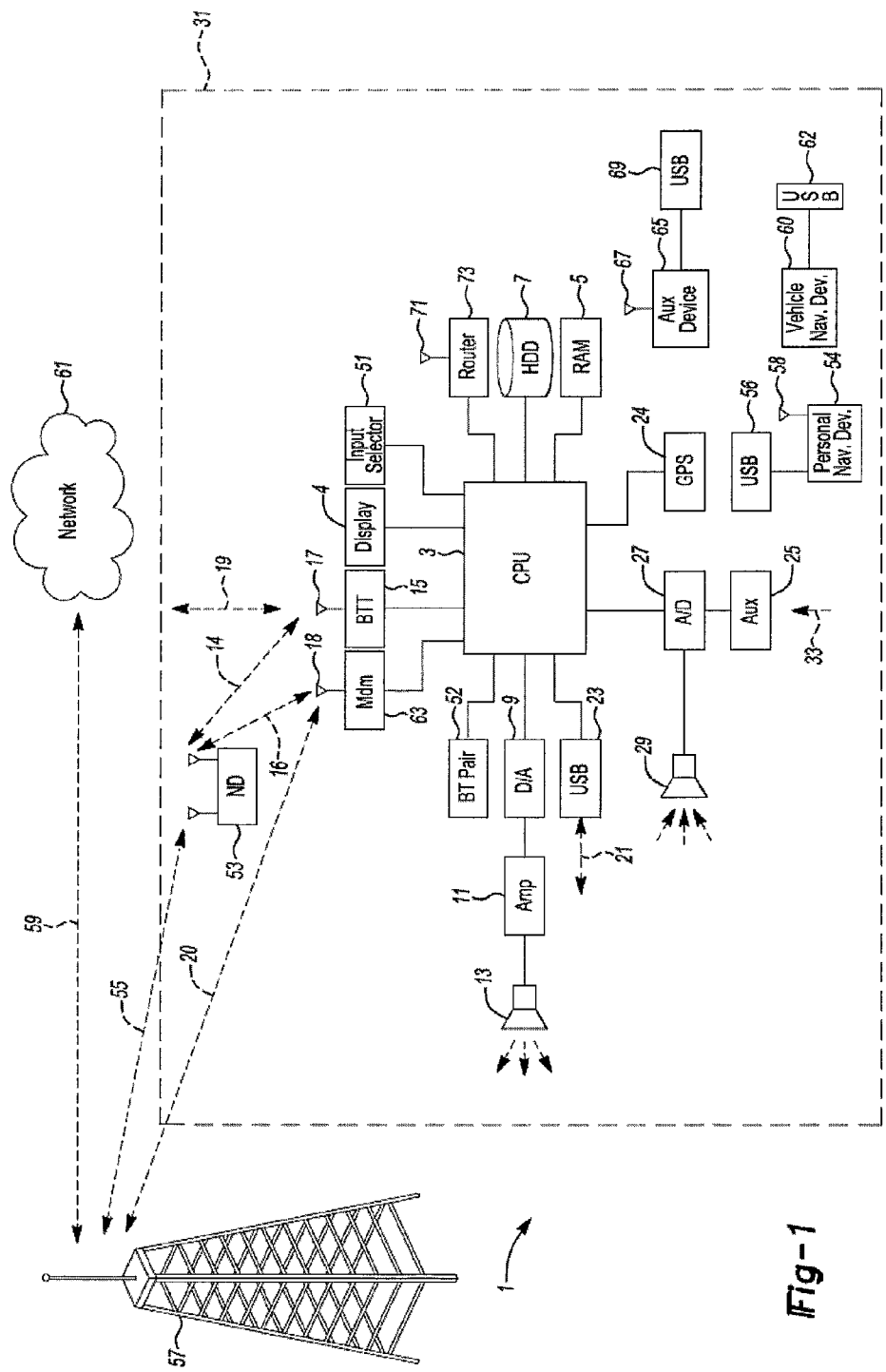
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Massive improvements have been made to vehicle connectivity and communication systems over the past few decades. In-vehicle infotainment systems provide remote connectivity, streaming music, customized advertisements, calendar management, hands free calling and a variety of other services. Additionally, automated emergency alerts (e.g., the system calls 911 in the case of a detected accident), vehicle navigation controls and various other connected services can be provided.

Vehicle infotainment systems, such as the Ford SYNC system, connect to wireless devices to obtain remote connectivity and access to applications running on the devices. Also, applications may be specifically developed for interfacing with a vehicle.

With all of these current systems and connectivity solutions, the in car and out of car experiences tend to be compartmentalized into their own environments. Vehicular interaction begins when a user enters a vehicle and ends when the user leaves the vehicle. User activity outside the vehicle is not combined with vehicular information.

In the illustrative embodiments, a seamless interaction between intra and extra vehicular activity is presented. Information from vehicular systems and relating to vehicle states, vehicular application interaction and other information can be passed to wireless device to continue an in-vehicle experience after a user leaves the vehicle. The wireless device can then perform a range of services based on the information, such as reminders, navigation and user updates. Then, when the user returns to the vehicle, further connectivity and information transfer updates the vehicle with the extra-vehicular activity. This information can be integrated into existing applications to improve the user experience.

Figure 2A:
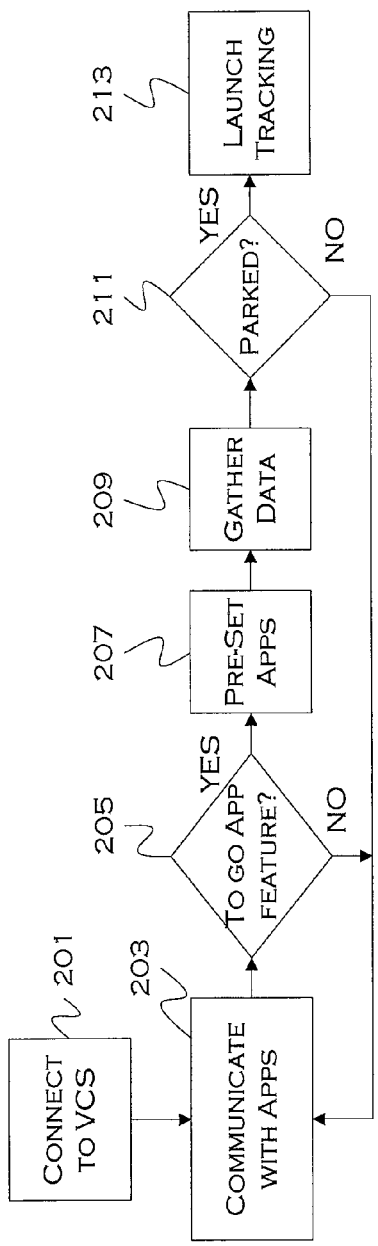
FIG. 2A shows an illustrative application preparation process.

FIG. 2A shows an illustrative application preparation process. In this illustrative example, a wireless device connects with the VCS 201. The wireless device can include, but is not limited to, a cellular phone, a tablet, a laptop, smart phone or other portable device. The connectivity in this process is handled by an application running on the wireless device. This application is capable of communicating with other applications running on the device, as well as applications running on the VCS. The application is further capable of obtaining information from vehicle subsystems, the CAN bus and any other appropriate sources.

In this illustrative embodiment the portability application communicates with other applications running on the mobile device, as well as applications running on the vehicle 203. For each application, it is determined whether the application has a "to go" feature included therewith 205. The to-go feature indicates that the application can benefit from a perpetuated experience. For example, without limitation, a vehicle navigation related application may include a shopping list. Accordingly, the vehicle may suggest stops along a route that relate to items on the shopping list (e.g., if a number of groceries are on the list, and a grocery store is passed, a recommendation may be made to stop).

If the user then stops at the store, and leaves the vehicle, the vehicular experience may end. But, if the grocery list is transmitted from the vehicle to the phone, the user can then access the list on the phone and check off groceries as they are purchased. When the user re-enters the vehicle, the information about which items were purchased can be transferred back to the vehicle, and the stored list can be updated.

In advanced cloud-connected navigation systems, it is possible to examine items on the grocery list and recommend stores that sell the items. For example, if a list contained milk and hamburger, the system might recommend a stop at a local grocery store to purchase the items on the list. When the user stops the vehicle, the grocery list may be transferred to a mobile device. If the user then purchases milk, and not hamburger, the user may note this on the mobile device.

When the user returns to the vehicle, the list may be transferred back to the vehicle for updating the list stored thereon. Once the list is updated, the vehicle system knows that only hamburger remains on the list. Resultantly, stores such as meat markets may now be recommended, as they provide additional options for completing the entire remaining list. This is just one example of how information can be transferred from the vehicle for remote use, used, updated and transferred back to the vehicle for continued use.

This example was provided for illustrative purposes only. Any number of conceivable portable situations can be envisioned where information can be usefully transferred from the vehicle to a mobile device, further utilized while the device is out of the vehicle, and then, if desired, transferred back to the vehicle for additional use when the user returns to the vehicle.

For each application that can utilize vehicular information when the user leaves the vehicle, the process may set up a function to gather useful data related to the application 207. Since there may be a limited amount of time to gather useful information when the vehicle is parked, the process may pre-gather data as the trip continues 207. Once the vehicle is parked 211, the application may engage a tracking mode for continued use of information while the user is out of the vehicle 213.

Figure 2B:
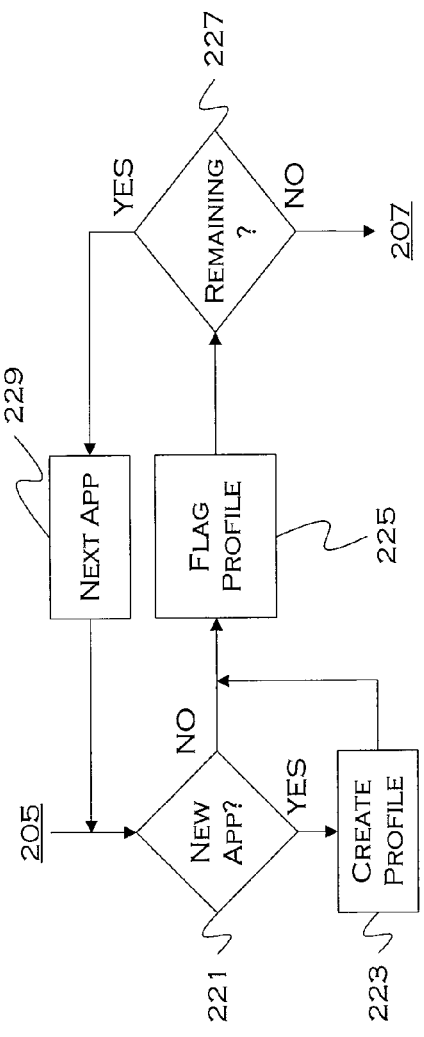
FIG. 2B shows an illustrative embodiment application flagging process.

FIG. 2B shows an illustrative embodiment application flagging process. Each running application (or each application) is examined to see if there is an out-of-vehicle functionality associated therewith. As each application is examined, the process checks to see if there is a profile associated with the application 221. The profile can be used to store information that is used in both the in and out of vehicle states. This information, as updated, keeps the applications up to date so that their functionality continues uninterrupted and accurately.

For each new application that has a to-go feature, the process may create a new profile for information storage 223. For each previously existing application, the currently existing profile may be accessed. For each profile accessed or created (corresponding to a currently running application or feature that has to-go options), the process may flag the profile for information gathering 225. If any application or features remain 227, the process proceeds to the next application for profile creation or flagging, if the application has a to-go feature associated therewith.

Figure 3:
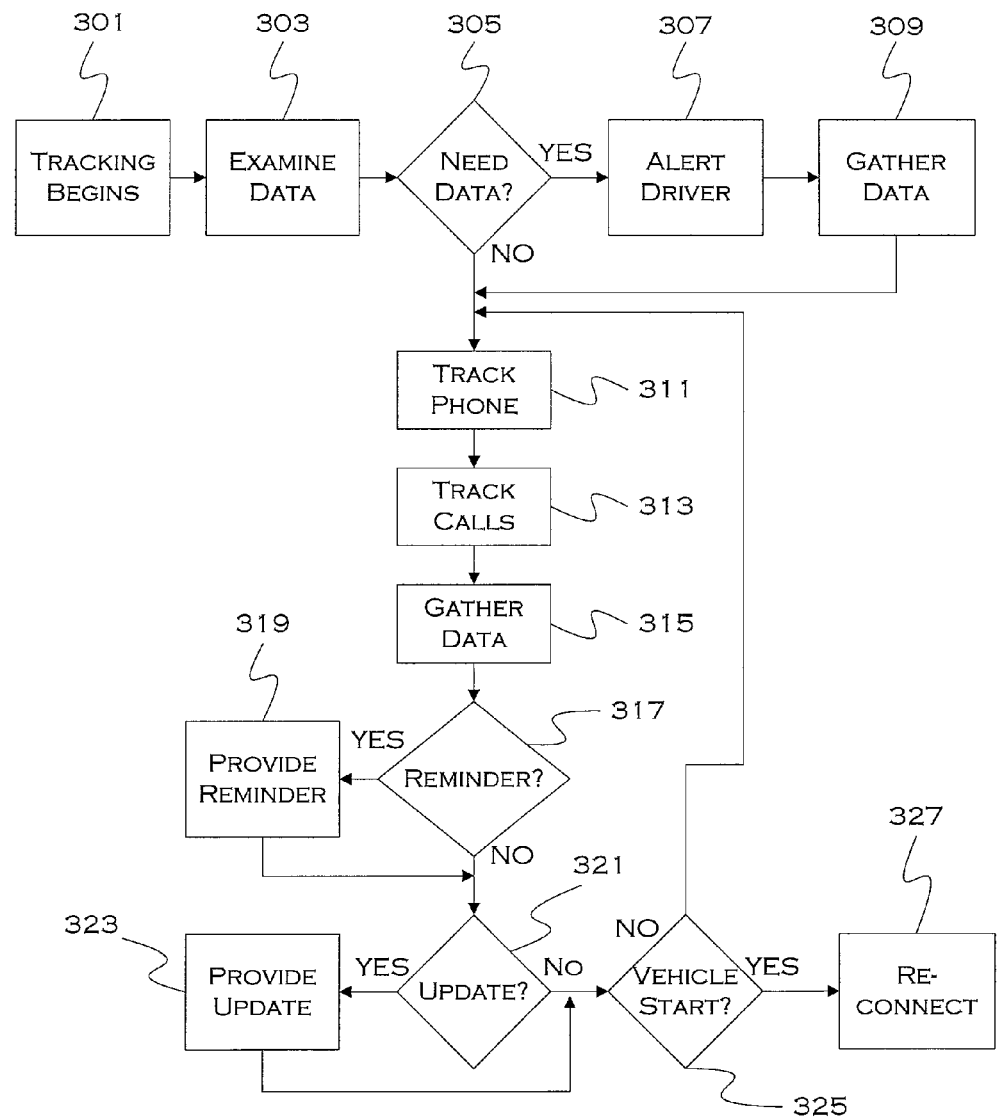
FIG. 3 shows an illustrative process for off-board tracking and updating.

FIG. 3 shows an illustrative process for off-board tracking and updating. Once the mobile device has been provided with the information for off-board use, the mobile application engages a tracking mode 301. This mode will gather the data necessary for the various applications as the user travels. Further, the portability application can instruct presentation of information to a user whenever an application would present the information.

In one illustrative embodiment, the portability application acts in a manner similar to that of the VCS. That is, whenever a secondary application running on the mobile device outside the vehicle outputs information that would be output on a vehicle display, the portability application provides a proxy for the vehicle computing system and functions to output the information on a mobile display. In other instances, the secondary application may output the information to the mobile display without aid of the portability application.

Once the tracking mode is engaged, the process examines the data that has been provided to the portability application 303. In some instances, additional data may be required for the application to function while the user is on-the-go 305. For example, if a data transfer/gathering was not completed while the vehicle was in drive, the user may be notified 307 not to power down the vehicle until the data transfer is complete. The process can then gather any additional data needed 309 before the user leaves the vehicle.

Once the user leaves the vehicle, several functions of the portability application may be engaged. First, the application may engage tracking of the phone 311. That is, the portability application may log GPS coordinates, as well as provide current GPS coordinates to any secondary applications running on the phone, in a manner similar to that of the VCS. As previously stated, the secondary applications can draw functionality from the phone directly, or the portability application can utilize the phone processing power and functionality (e.g. GPS capability) to act as a proxy for the VCS.

The coordinate logging is provided in some instances so that the vehicle can be notified of where the user has traveled during the out of vehicle experience. For example, if a calendar appointment was sent in-vehicle on a vehicle calendar function for 2:30 PM at 100 Smith Lane. If the user leaves the vehicle at 1:30 PM, the calendar appointment may be transferred to the phone. At some point near 2:30 PM, the user may be provided with a reminder for the appointment, just as if the user were in the vehicle. Further, the GPS functionality may record that the user reached 100 Smith Lane (on foot, for example) around 2:30 PM. Thus, presumably, the appointment was met. The phone can record this incident, and, when the user returns to the vehicle, inform the vehicle that the user was present at 100 Smith Lane at 2:30 PM. Accordingly, the vehicle can update the calendar appointment as having been met, and doesn't need to report to the user that an appointment may have been missed.

Through this tracking functionality, any applications utilizing GPS coordinates in-vehicle can be continued in the extra-vehicle experience, and/or can be updated when the user returns to the vehicle environment.

Additionally or alternatively, call tracking may be provided 313. This functionality can track made calls, missed calls, sent texts and unviewed texts. This information can be useful for vehicle notification functions. For example, without limitation, made calls can remove call-back reminders (as can sent texts) from a call back reminder function, missed calls can be added to the call-back reminder function, and unviewed texts can be added to text alert functions.

Further, the portability application may engage in general data gathering 315. This can include, but is not limited to, data requested by applications (the grocery list example), data useful for in-vehicle applications, and any other data that the phone is capable of automatically acquiring or that would require input. For example, if a coupon function provided a coupon to the phone, redemption of the coupon could be reported back to an advertising function in the vehicle, to assist in deciding which advertisements should be selected. Similarly, the advertising function may have provided information to the phone before the user left the vehicle, so that advertisements selected while out of the vehicle would likely correspond to areas of the user's interest, based on past observations.

In some instances, one or more applications may need to provide a user with a reminder 317. For example, if the advertising in-vehicle function provided a McDonald's coupon, and the user walked close to a McDonald's, the portability application may act as a proxy for the in-vehicle application and remind 319 the user that they have a redeemable coupon. Alternatively, a secondary advertising application on the mobile device may provide the reminder 319.

Similarly, there may be one or more updates needed to existing information 321. Again, as with the grocery list, if the user completes a shopping trip and the list has had several items checked off, the process may update the data relevant to the grocery list 323, so that future shopping recommendations are only based on items remaining to be purchased.

This gathering and update process can continue until the vehicle starts up again 325, at which point the mobile device reconnects to the VCS 327. At this point, all gathered and updated data, as well as application states, can be transferred back to the vehicle.

FIG. 4 shows an illustrative for importing data back to a vehicle. Once the mobile device has been connected back to the vehicle, a reconnection process for data transfer can begin 401. The process waits until a connection has been established 403, and then prepares any data on the mobile device for transfer to the vehicle 405. Since the device may have gathered some amount of data without specific intent for the data (e.g., tracked GPS coordinates), the device may attempt to determine which of this data is actually desired by the vehicle. In other instances, all gathered data may be sent to the vehicle for processing.

Once any needed data preparation is completed, the device sends the data to the vehicle 407. The vehicle will then process the data accordingly, using it to update any applications running on the vehicle, as well as logging any data that needs to be logged. This may also cause one or more updates to be sent to applications running on the mobile device. In such a case, the mobile device will receive the updates coming from the vehicle 407, and use these to update the application profiles on the mobile device, as appropriate.

FIG. 5 shows an illustrative vehicle re-entry update process. In this illustrative example, the vehicle receives the reconnection request from the mobile device 501. Once the mobile device has completed any data preparation, the vehicle receives 503 the data transferred from the mobile device. This data corresponds to data gathered and generated while the mobile device was used in an extra-vehicular manner.

The vehicle can then access any processes and applications 505 that can benefit from the data, and update the processes and application 507 as needed. In the calendar example previously given, the vehicle would receive the locations of the user and the various times associated with each location. This could then be cross referenced with the calendar application to "guess" at which appointments were met or not met. Similarly, with the grocery application, the grocery list information could be used to update an internal grocery list. These are just two non-limiting examples of how a seamless flow of application usage and data gathering from the vehicle experience, to the extra-vehicular experience, and back can benefit a user.

In some instances, changes to internal vehicular data, based on the received data, may cause updates to a mobile application. In these instances, it may be desirable to return some subset of data or update instructions to the mobile device 509. Any needed data can be transferred 511 and then the vehicle can return to monitoring the processes and applications 513, now that the user has returned to the vehicle.

An exemplary instance of a to-go service will be described below. In the illustrative embodiments described below, a post-accident status update is contemplated. In a traditional vehicular emergency reporting system, the vehicle detects an accident and contacts an emergency service provider. The vehicle then communicates information related to the accident to the EMS provider.

In the current environments under which this paradigm occurs, reporting completes once the necessary information has been delivered. If a user is taken by ambulance to a hospital, for example, there is no indicia provided of this trip, or of the user location. At best, a loved one can call the user or contact emergency services for further information.

In the illustrative embodiments, after an emergency call is completed, the vehicle will instruct an application (such as, but not limited to, the portability application discussed herein) to take over processing for the in-vehicle 911 application. Using the mobile device, a greater range of services can be provided, even when the user has left the vehicle environment.

For example, without limitation, user location updates can be provided until the user reaches a hospital. These updates can be sent to emergency contacts, and can allow the contacts to track the progress of the user so that the emergency contacts know that the user is safely en-route to receive medical attention.

Figure 6A:
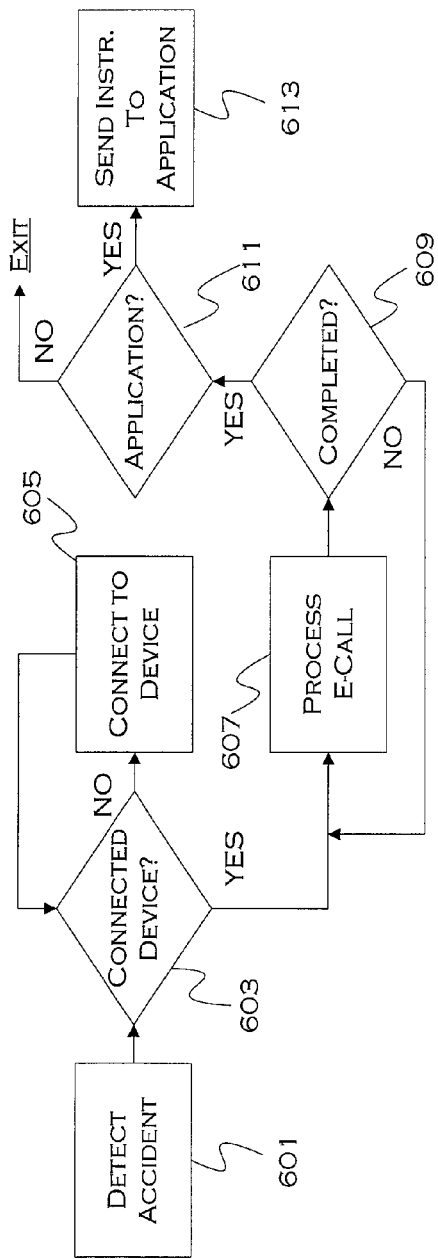
FIG. 6A shows an illustrative example of an application transfer process.

FIG. 6A shows an illustrative example of an application transfer process. In this illustrative example, the vehicle first detects that an accident has occurred 601. Since 911 reporting is desired, the process determines if a mobile device is connected to the vehicle 603. If the device is not connected, the vehicle computing system will attempt to continue to connect to the device 605 until a connection is established.

Once the connection to the mobile device has been established, the vehicle can proceed with outgoing communication. In this illustrative example, the device processes an emergency call 607 in accordance with emergency call procedures provided to the vehicle system. This processing will continue until the emergency call and information transfer is complete 609.

Upon completion of the emergency call, the process then checks to see if a portability application or secondary e-call application is present on the connected device 611. This is the application that will allow tracking of the user once the user has left the vehicle environment. If the application is present, the process instructs the device to enter a reporting mode 613.

Figure 6B:
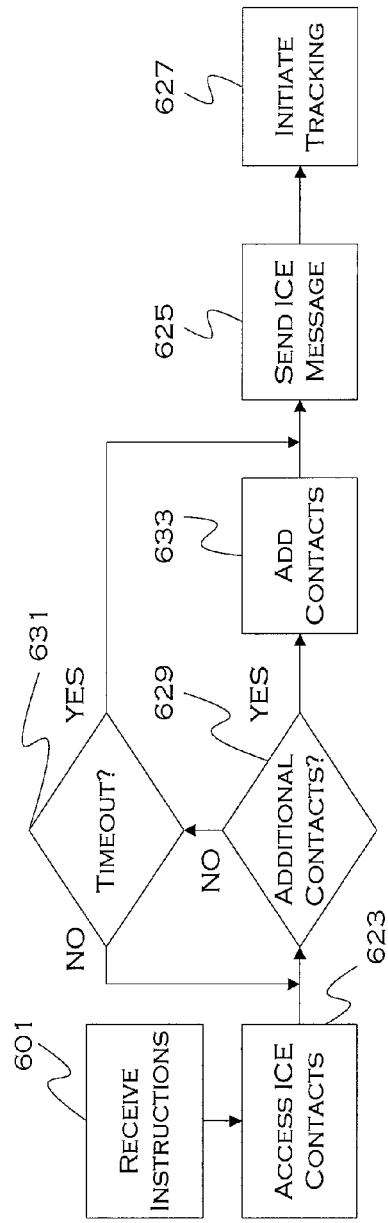
FIG. 6B shows an illustrative example of a contact aggregation process.

FIG. 6B shows an illustrative example of a contact aggregation process. Once the device is in reporting mode, a message may be sent to in case of emergency (ICE) contacts. These can be contacts that are pre-designated as ICE contacts, or they can be selected from a list of contacts by the user. In FIG. 6B, the mobile device receives instructions to process the reporting and user tracking 621. Once these instructions are received, the device accesses a list of ICE contacts 623 including their phone numbers and/or email addresses. Other information can also be provided, such as links to social media sites and any other data that might be useful for information processing.

Also, in this embodiment, the user is presented with an opportunity to add additional contacts to the reporting list.

For example, if the user is injured, but still capable of phone use, the user may want to notify work or other parties of the problem. By adding one or more contacts to the reporting, information can be quickly and easily reported without the user having to make a number of phone calls or send a number of texts.

It is also possible that the user is severely injured, and in no condition to send out contact information. In this case, the process has a timeout feature built in, so that if the user doesn't respond or interact with the contact request for some time period, the process times-out 631. Otherwise, once the contacts have been added 633 as requested by the user, the process will send an emergency message to the contacts 625. Once this first message has been sent to the relevant parties, a tracking mode can be engaged that allows for vehicular tracking 627.

Figure 7:
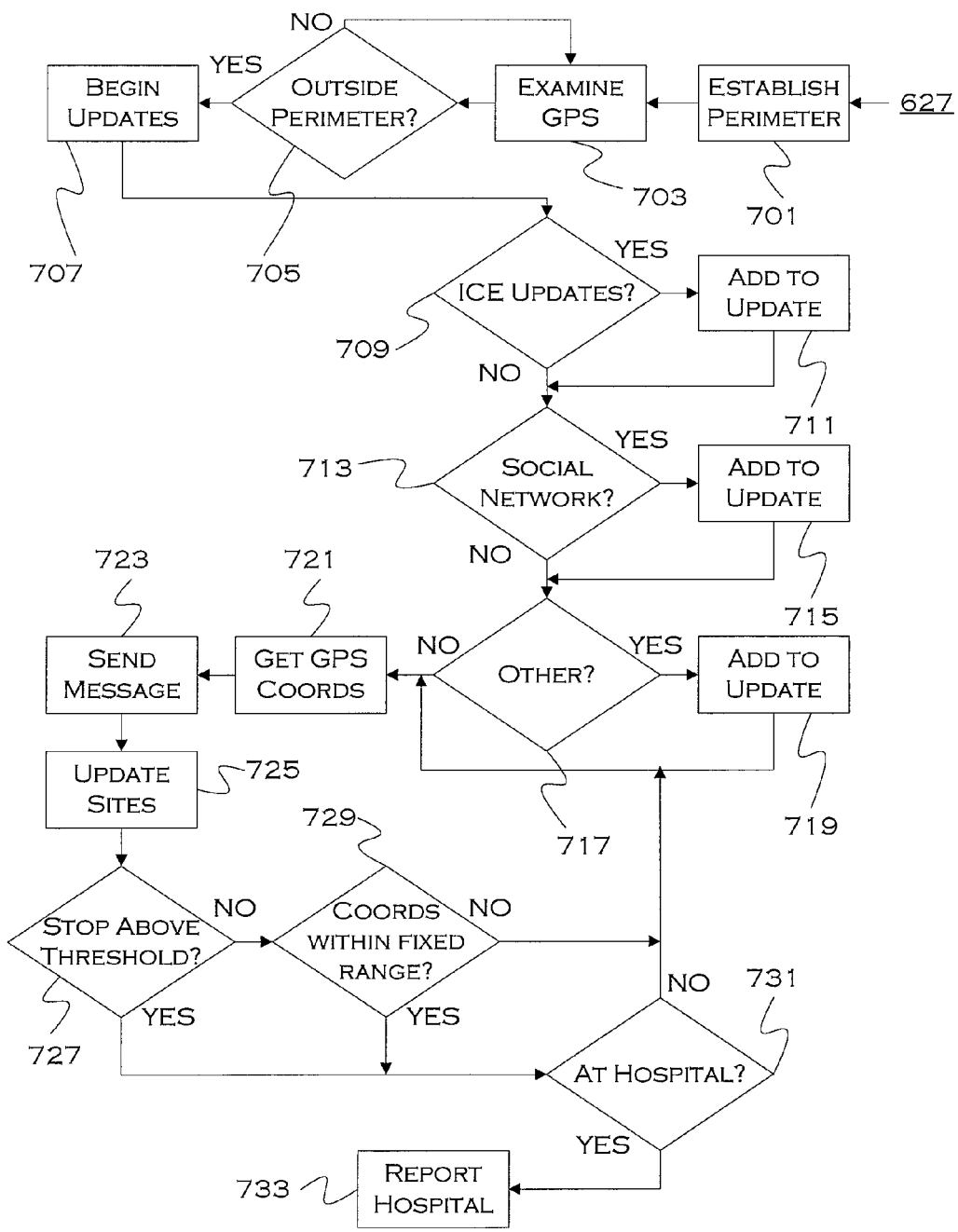
FIG. 7 shows an illustrative example of a post-accident reporting process.

FIG. 7 shows an illustrative example of a post-accident reporting process. In this illustrative example, the process establishes a perimeter around a last known vehicle GPS location 701. This perimeter assists in the tracking of the user, and ensures that updates are not continually sent while the user is still at the site of the accident. On the other hand, it could be useful for the ICE contacts to know if a user isn't leaving the scene, which could indicate that the user is injured and not receiving assistance. Accordingly, a temporal limitation could be built in as well, such that if the phone remains within the perimeter for a predetermined time period, notification is sent to the ICE contacts as well.

In this illustrative example, the phone will examine its GPS location 703 so that the phone has a sense of its present location. Until the phone moves outside the perimeter 705, in this example, reporting is delayed. This will persist, unless the timeout or another state-change variable is employed, for example.

Once the phone leaves the perimeter of the accident 705, the process assumes that the user is either leaving under their own power or en-route to a hospital. Since the user may not actually be in an ambulance, the process may provide an option for the user to cancel reporting if desired, so as not to overly worry ICE contacts. The process can be cancelled at any time, but if it is not cancelled, the process will begin providing updates.

Updates can come in the form of texts, emails or posting to social networks, as just a few examples. Information sent can include user identification, current location, and, if known or guessable, estimated time to destination (i.e., the hospital). For example, if the only proximate hospital is five miles north of the crash, and the ambulance is headed north, it is reasonable to assume that the user is headed to that hospital. Estimated time to destination can then be provided based on the location of the phone vs. the location of the hospital.

In the illustrative embodiments, the process first determines all of the possible recipients for any provided updates. If any ICE contacts will be provided with user updates 709, the process adds the relevant parties to the reporting list. Similarly, if any social networking sites (such as a facebook status update) are to be added 713, the process will add the social networking sites to the update status list 715. Other update recipients may also exist 717, and they too can be added to a list of entities 719 to which reporting is to occur.

Once an "update list" (a list of recipients for updates) has been created, the process will begin reporting data related to a user's positional status. GPS coordinates of the phone are obtained 721. Presumably, these coordinates will correspond to a user's present location. In conjunction with the coordinates, a message including any additional information may be prepared for inclusion with a report. The message and the coordinates (as permitted by the user) can be sent to any receiving parties 723. Also, any relevant status updates to social media may be performed 715.

Several tests are then made to determine if a user has arrived at a hospital. In this scenario, reporting ceases once a user arrives at the hospital, although if desired reporting could continue until cancelled by the user. In this case, the process first checks to see if a vehicle has stopped for longer than a threshold period of time 727. This will generally tend to indicate that the user has reached a final destination, such as a hospital. By including a threshold period of time, the process attempts to compensate for stop lights, traffic delays and other road features that may cause the ambulance to stop moving. The stop is determined by unchanged GPS coordinates.

Of course, once the user reaches the hospital, their coordinates will likely continue to change for some time, as they are transported into and throughout the hospital. To account for this, the process also checks to see if a number of reported coordinates are all within a fixed range of each other 729. This will indicate that the user is moving within a building, as opposed to along a roadway. Since successive coordinates are all compared to each other, a series of coordinates in close proximity will tend to indicate that the user is at a fixed location.

Once it is determined that a user is at a stop point, through the methods described above, for example, the process checks to see if that stop point corresponds with a known hospital 731. If so, information relating to the hospital can be reported 733, and ICE contacts can know that the user is safely at the hospital. If the information does not correspond to a known hospital, the process may keep reporting so that ICE contacts can check up on the user and ensure that proper medical care is being obtained.

By providing ICE contacts and others with user updates after the user leaves the vehicle, the illustrative embodiments improve the driver experience through advanced crash monitoring. They can also aid in life-saving, as the reporting features can show other parties if appropriate medical care is being obtained.

In at least one illustrative example, ICE contacts may be able to respond to messages sent by the device and have the responses distributed to the group (as well as the device owner). This can be facilitated through the device, if it not a natural function of the medium (i.e., in a Facebook post, others could post to Facebook, but if the notification was text based, the device may have to send out the notification to the other users. In this example, if the device receives responsive communication, the device can then facilitate delivery of the communication to the other users by sending the responsive communication out as a group message.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A computer-implemented method comprising:
receiving data from an executing in-vehicle application via a mobile device application;
receiving data tracking instructions from the vehicle for altering the received data based on user extra-vehicular activity;

tracking user extra-vehicular activity, including modifying the received data as user activity is tracked in accordance with the instructions; and sending tracked user extra-vehicular activity and modified received data back to the vehicle.

2. The method of claim 1, further comprising determining a subset of the tracked user activity to send to the vehicle.

3. The method of claim 2, wherein the subset is determined based on the received instructions.

4. The method of claim 1, wherein the mobile device application behaves as a proxy for the in-vehicle application.

5. The method of claim 4, further comprising presenting data, through the mobile device application, on a mobile device, as the data would have been presented by the in-vehicle application.

6. The method of claim 1, wherein the modified received data includes mobile device coordinates tracked during an away-from-vehicle experience.

7. The method of claim 1, wherein the modified received data includes mobile device communication usage during an away-from-vehicle experience.

8. A system comprising:
a processor configured to:
receive data from an executing in-vehicle application via a mobile device application;
receive data tracking instructions from the vehicle for altering the received data based on user extra-vehicular activity;
track user extra-vehicular activity, including modifying the received data as user activity is tracked in accordance with the instructions; and
send tracked extra-vehicular user activity and modified received data back to the vehicle.

9. The system of claim 8, wherein the processor is further configured to determine a subset of the tracked user activity to send to the vehicle.

10. The system of claim 9, wherein the subset is determined based on the received instructions.

11. The system of claim 8, wherein the mobile device application behaves as a proxy for the in-vehicle application.

12. The system of claim 11, wherein the processor is configured to present data, through the mobile device application, on a mobile device, as the data would have been presented by the in-vehicle application.

13. The system of claim 8, wherein the modified received data includes mobile device coordinates tracked during an away-from-vehicle experience.

14. The system of claim 8, wherein the modified received data includes mobile device communication usage during an away-from-vehicle experience.

15. A non-transitory machine-readable storage medium, storing instructions that, when executed by a processor, cause the processor to perform a method comprising:
receiving data from an executing in-vehicle application via mobile device application;
receiving data tracking instructions from the vehicle for altering the received data based on user extra-vehicular activity;
tracking user extra-vehicular activity, including modifying the received data as user activity is tracked in accordance with the instructions; and
sending tracked user extra-vehicular activity and modified received data back to the vehicle.

16. The storage medium of claim 15, the method further comprising determining a subset of the tracked user activity to send to the vehicle.

17. The storage medium of claim 16, wherein the subset is determined based on the received instructions.

18. The storage medium of claim 15, wherein the mobile device application behaves as a proxy for the in-vehicle application.

19. The storage medium of claim 15, wherein the modified received data includes mobile device coordinates tracked during an away-from-vehicle experience.

20. The storage medium of claim 15, wherein the modified received data includes mobile device communication usage during an away-from-vehicle experience.

* * * * *